(12) United States Patent
Childress et al.

(10) Patent No.: US 7,540,226 B2
(45) Date of Patent: Jun. 2, 2009

(54) AIRCRAFT ENGINE STRUCTURE-MOUNTED AIM-POINT BIASING INFRARED COUNTERMEASURE APPARATUS AND METHOD

(75) Inventors: Jamie J. Childress, Mercer Island, WA (US); Edward C. Marques, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 391 days.

(21) Appl. No.: 11/260,558

(22) Filed: Oct. 28, 2005

(65) Prior Publication Data

US 2008/0006738 A1 Jan. 10, 2008

(51) Int. Cl.
*B64D 1/04* (2006.01)
(52) U.S. Cl. .......................... 89/1.11; 244/3.16; 342/14
(58) Field of Classification Search ................ 244/3.16, 244/53 R, 121; 89/1.11; 250/495.1; 342/14
See application file for complete search history.

(56) References Cited

U.S. PATENT DOCUMENTS

| | | | | |
|---|---|---|---|---|
| 4,618,224 A | * | 10/1986 | Smith | 359/841 |
| 5,600,434 A | * | 2/1997 | Warm et al. | 356/139.08 |
| 5,703,314 A | * | 12/1997 | Meeker | 89/1.11 |
| 6,267,039 B1 | * | 7/2001 | Czarnecki | 89/1.11 |
| 7,028,947 B2 | * | 4/2006 | Burns | 244/1 TD |
| 7,378,626 B2 | * | 5/2008 | Fetterly | 244/3.1 |

FOREIGN PATENT DOCUMENTS

WO 024559 9/2003

OTHER PUBLICATIONS

CRS Report for Congress, "Homeland Security: Protecting Airliners From Terrorist Missiles" by Bolkcom et al., Feb. 15, 2005, pp. 1-25.
Northrop Grumman News Release, "Large Aircraft Infrared Countermeasures (LAIRCM)", Aug. 1, 2005, pp. 1-2.
Northrop Grumman News Release, "Northrop Grumman Readies Commercial Aircraft Anti-Missile System", Aug. 1, 2005, p. 1.
GlobalSecruity.org, AN/AAQ-24 Directional Infrared Countermeasures (DIRCM); Apr. 27, 2005; pp. 1-4.
AOC Position Statement "Missile Defense Systems for the American Commercial Airline Fleet"; Oct. 30, 2003; pp. 1-2.
NASA presentation "NASA Glen—Progress in Fire Protection Research"; Nov. 5-6, 2003; 4 pgs.

(Continued)

*Primary Examiner*—Tien Dinh

(57) ABSTRACT

A thermal radiation-generating decoy mounted adjacent an aircraft engine structure, such as an engine nacelle, includes a heat source inside of an aerodynamic enclosure with a mounting interface to attach the enclosure to the engine structure. The decoy can further be located at the lower extreme of and adjacent the forward-most portion of the engine nacelle in order to attract an infrared-seeking threat to the vicinity of the fan containment portion of the engine nacelle. The decoy can be designed to have a thermal signature that mimics a scaled overall aircraft thermal signature. In addition, the decoy can include a fuse shield adjacent the enclosure to detonate a threat in the case that the threat approach trajectory is imprecise and the threat bypasses the enclosure within an aspect of the fuse shield as viewed from the approach direction of the threat.

22 Claims, 4 Drawing Sheets

OTHER PUBLICATIONS

SFGate.com "Air Force Pursuing Secret Program to Protect Airlines—Military Grew Impatient with Agency's Efforts", Paul J. Caffera, Apr. 9, 2004; 3 pgs.
RDT&E Budget Item Justification Sheet (R-2); Feb. 2005; pp. 1-29.
Department of Homeland Security Fact Sheet "Countering Missile Threats to Commercial Aircraft"; Jan. 6, 2004; pp. 1-3.
www.USINDEFENSE.org; "Countering Manpads"; Dec. 2-3, 2003; 5 pgs.
DHS Industry Forum "Counter-Man-Portable Air Defense Systems"; Mar. 8, 2004; 5 pgs.
Low Altitude Air Defense Handbook, chapter 2: "Stinger Weapon System"; pp. 1-18, Jun. 12, 1998.
Raytheon "Manpads Stinger"; Copyright 2002-2004; 2 pgs.
"The SA-7 Missile Threat"; Aug. 1, 2005; 3 pgs.
Raytheon "Raytheon (General Dynamics) FIM-92 Stinger"; Copyright 2002-2005 by Andreas Parsch; 7 pgs.
MBDA Missile Systems "Mistral Manpads—lightweight man-portable air defence system"; Jun. 2004; 2 pgs.
"Manpads Proliferation" by Sarah Chankin-Gould et al.; Jan. 2004; 14 pgs.
"Aircraft Survivability" published by the Joint Aircraft Survivability Program Office; Spring 2003; 48 pgs.
Rand "Infrastructure, Safety, and Environment" by James Chow, et al.; Copyright 2005; 46 pgs.

* cited by examiner

AIRCRAFT ENGINE STRUCTURE-MOUNTED AIM-POINT BIASING INFRARED COUNTERMEASURE APPARATUS AND METHOD

FIELD OF THE INVENTION

The present invention relates generally to aircraft survivability. More particularly, the present invention relates to countermeasures against infrared-seeking missiles.

BACKGROUND OF THE INVENTION

Man Portable Air Defense Systems (MANPADS), such as shoulder-launched missiles, have been proliferated throughout the world, creating a potential danger not only to military aircraft, but also to commercial aircraft. Countermeasures against MANPADS and similar threats to aircraft safety have been developed primarily for military aircraft. As a result, concerns regarding the safety of commercial transport aircraft—and in particular, commercial aircraft survivability against the threat of MANPADS—have increased sharply during recent years.

A majority of MANPADS implement infrared (IR) band seekers. IR seekers track a target aircraft in response to individual thermal sources, such as engine hot parts, plumes, lighting elements, heated aircraft surfaces and reflections. Past attempts to achieve aircraft survivability in response to MANPADS have commonly focused on susceptibility reduction, or "hit avoidance," features. Infrared countermeasures (IRCM) aimed at reducing the likelihood of aircraft impact after launch of infrared-seeking threats have included pyrotechnic or pyrophoric devices, such as flares, expendables, other incendiary devices or infrared chaff; infrared lamp countermeasures; and either advanced-threat infrared countermeasures (ATIRCM) or directed infrared countermeasures (DIRCM), which can use directed, high-powered lamps or lasers to disrupt MANPADS tracking capability.

Generally, existing IRCM systems require knowledge of a missile launch to be effective. For some systems, both launch warning and missile approach direction knowledge are required for the system to be effective. Flares or other expendables can be dispensed in reaction to a launch warning or in anticipation of a launch, but the duration of protection is limited by the payload of expendables. Although launch warning is not required for an omni-directional IR lamp countermeasure, the IR lamp systems are not highly effective against some MANPADS threats.

A classic example of an operational vulnerability reduction system is a sacrificial engine-nozzle extension implemented on some Israeli A4 aircraft. Infrared-seeking missiles attracted to this hot-spot location destroyed only the sacrificial extension. Flight-critical engine components were protected. Some limitations of the nozzle extension concept include the considerable weight of the sacrificial extension and the prohibitively high cost of retrofit on most aircraft types. In addition, the sacrificial engine nozzle extension used on Israeli A-4 aircraft is not well-suited for many commercial aircraft which have an under wing installation of engines on the main wing, since such an extension would need to protrude a considerable distance aft of the engine in order to be clear of the aircraft fuselage and empennage.

As an alternative to—or in addition to—hit avoidance features, countermeasures can include "hit acceptance" features. For example, an infrared lamp can be installed on a sacrificial support structure to protect the targeted aircraft's most critical components. Approaching missiles are coaxed away from the aircraft's most critical zones, increasing aircraft survivability to MANPADS missile hits.

However, technologies that have been developed and implemented for military or other specialized purposes generally are incompatible with commercial aircraft operations. Moreover, even to the extent that existing technologies may be compatible with commercial aircraft operations, development of commercial implementations of the technologies would require an extended period of time.

Accordingly, it is desirable to provide a countermeasure for infrared-seeking threats that is relatively inexpensive, can be developed and implemented in a relatively short period of time on a significant portion of the commercial aircraft fleet, and can significantly increase aircraft survivability without creating new vulnerabilities.

SUMMARY OF THE INVENTION

The foregoing needs are met, to a great extent, by the present invention, wherein in one aspect an apparatus is provided that in some embodiments can be mounted adjacent an engine structure in order to attract and detonate an infrared-seeking, shoulder-fired missile, taking advantage of the robust, damage-resistant attributes typical to some engine structures to protect more vulnerable aircraft structures and increase aircraft survivability.

In accordance with one aspect of the present invention, a thermal radiation-generating decoy mounted adjacent an aircraft engine structure can include a heat source to generate thermal radiation, an enclosure to at least partially enclose the heat source, and a mounting interface configured to fixedly couple the enclosure adjacent the engine structure to attract an infrared-seeking threat.

In accordance with another aspect of the present invention, a thermal radiation-generating decoy mounted to an aircraft structure can include a heat source to generate thermal radiation, an enclosure to at least partially enclose the heat source, and a mounting interface configured to fixedly couple the enclosure adjacent the structure to attract an infrared-seeking threat. In addition, the decoy can include a fuse shield fixedly coupled adjacent the enclosure to detonate the threat in the case that the threat bypasses the enclosure within an aspect of the shield.

In accordance with yet another aspect of the present invention, a thermal radiation-generating decoy mounted to an aircraft engine structure can include means for generating heat, means for at least partially enclosing the heat-generating means, and means for fixedly coupling the enclosing means adjacent the engine structure to attract an infrared-seeking threat.

In accordance with still another aspect of the present invention, a thermal radiation-generating decoy mounted to an aircraft structure can include means for generating heat, means for at least partially enclosing the heat-generating means, and means for fixedly coupling the enclosing means adjacent the structure to attract an infrared-seeking threat. In addition, the decoy can include shield means adjacent the enclosing means for detonating the threat in the case that the threat bypasses the enclosing means within an aspect of the shield means.

In accordance with still another aspect of the present invention, a method of attracting and detonating an infrared-seeking threat can include generating thermal radiation by means of a heat source, at least partially enclosing the heat source in an enclosure, and fixedly coupling the enclosure adjacent an aircraft engine structure. The method can further include detonating the threat in the case that the threat strikes the enclosure and in the case that the threat bypasses the enclosure within a fuse shield aspect.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment in accordance with the present invention provides a fixed, sacrificial, infrared decoy device that can be mounted to an aircraft engine structure to attract and detonate an infrared-seeking threat, such as a shoulder-fired missile. The engine structure-mounted decoy can increase the probability that an incoming threat will be detonated in the immediate vicinity of an engine structure, which is designed to be highly robust and damage-resistant in order to withstand high-energy engine failures, such as a compressor, turbine or fan rotor burst. Thus, the incoming threat can be attracted to a general area of the aircraft that would in any case be a likely target of the infrared-seeking threat, and can further be guided to a specific locality that is most likely to ensure aircraft survivability.

By attracting the infrared-seeking threat to a more precise location in the vicinity of the forward portion of the engine nacelle, a very high proportion of incoming infrared threats can be detonated in an area that is relatively unlikely to result in irrecoverable damage to the aircraft. Importantly, this placement of the decoy device does not create a new target area that would not otherwise likely be targeted by an infrared-seeking threat, such as a shoulder-fired missile.

Figure 1:
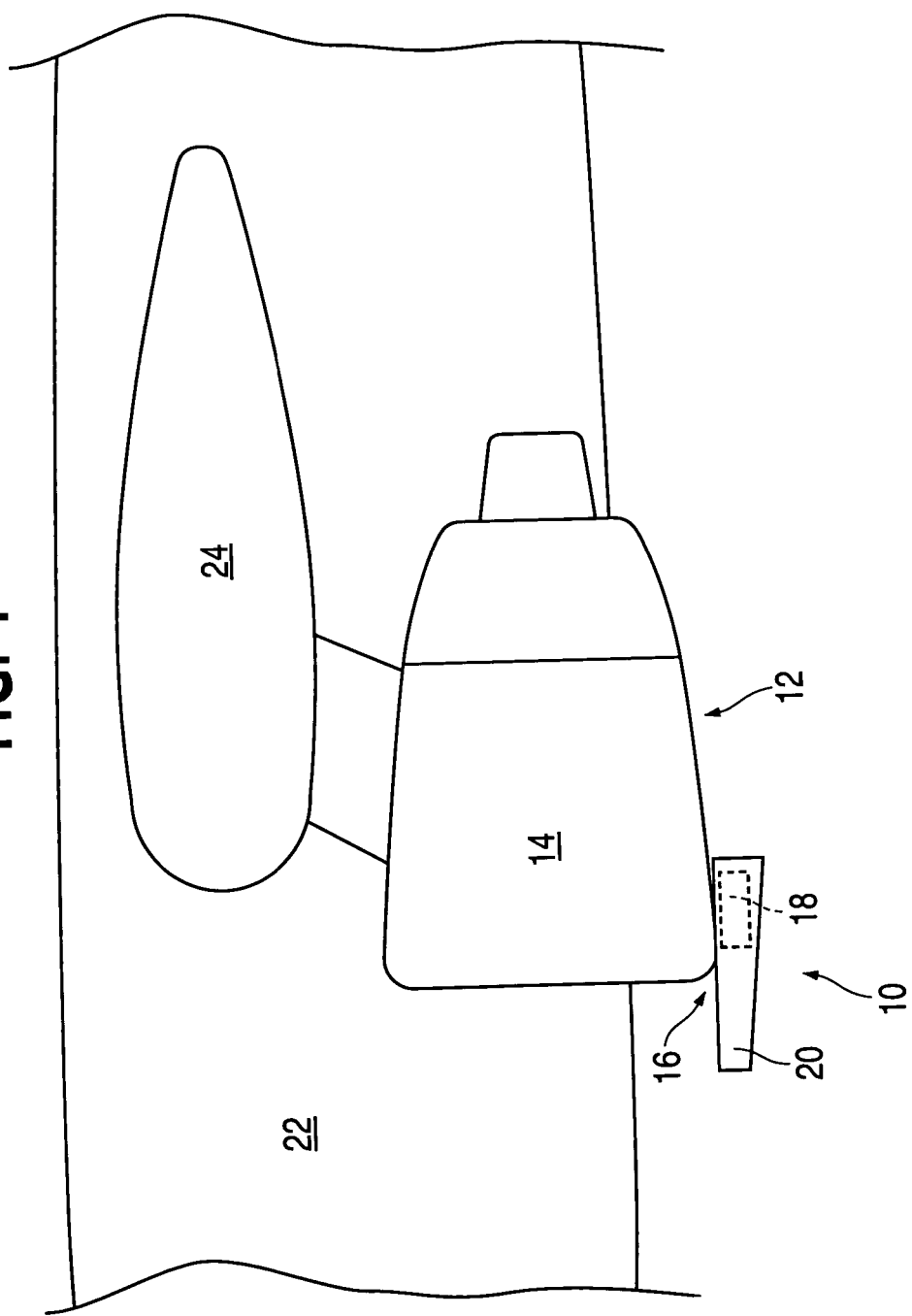
FIG. 1 is a side view of an infrared-seeking threat decoy mounted to an aircraft engine structure according to a preferred embodiment of the invention.

Preferred embodiments of the invention will now be further described with reference to the drawing figures in which like reference numerals refer to like parts throughout. An embodiment of the present inventive apparatus and method is illustrated in FIG. 1. A thermal radiation-generating decoy 10 can be mounted adjacent an aircraft engine structure 12, such as an engine cowling or nacelle 14, by way of a mounting interface 16. The thermal radiation-generating decoy can include an internal heat source 18 enclosed by an enclosure 20, which can be aerodynamically shaped to reduce drag on the aircraft. In some embodiments, the decoy 10 can be mounted approximately on the diametrically opposite side of the engine nacelle 14 from a vulnerable aircraft structure, such as the airplane fuselage 22 or main wing 24. Furthermore, in various embodiments a decoy 10 can be attached to a single engine, or to one engine on each the port and starboard sides of the aircraft, or to more than one engine on each side of the aircraft.

As illustrated in FIG. 1, in a preferred embodiment of the invention, the decoy 10 can be mounted at or near the lowest extreme of the engine nacelle circumference, and can be adjacent a forward portion of the engine nacelle 14. Furthermore, the decoy 10 can be installed adjacent a forward portion of the engine nacelle 14 such that the decoy 10 protrudes forward of the engine nacelle 14 as shown in FIG. 1. This placement configuration can increase the probability that an incoming infrared-seeking threat will be detonated in the vicinity of the forward portion of the engine nacelle 14, or will bypass the engine and the decoy 10 and continue on a flight path, or miss trajectory, that likely will not intercept the aircraft structure. Ideally, the decoy 10 would be mounted forward of the engine nacelle 14, for example on a forward protruding pole.

Figure 2:
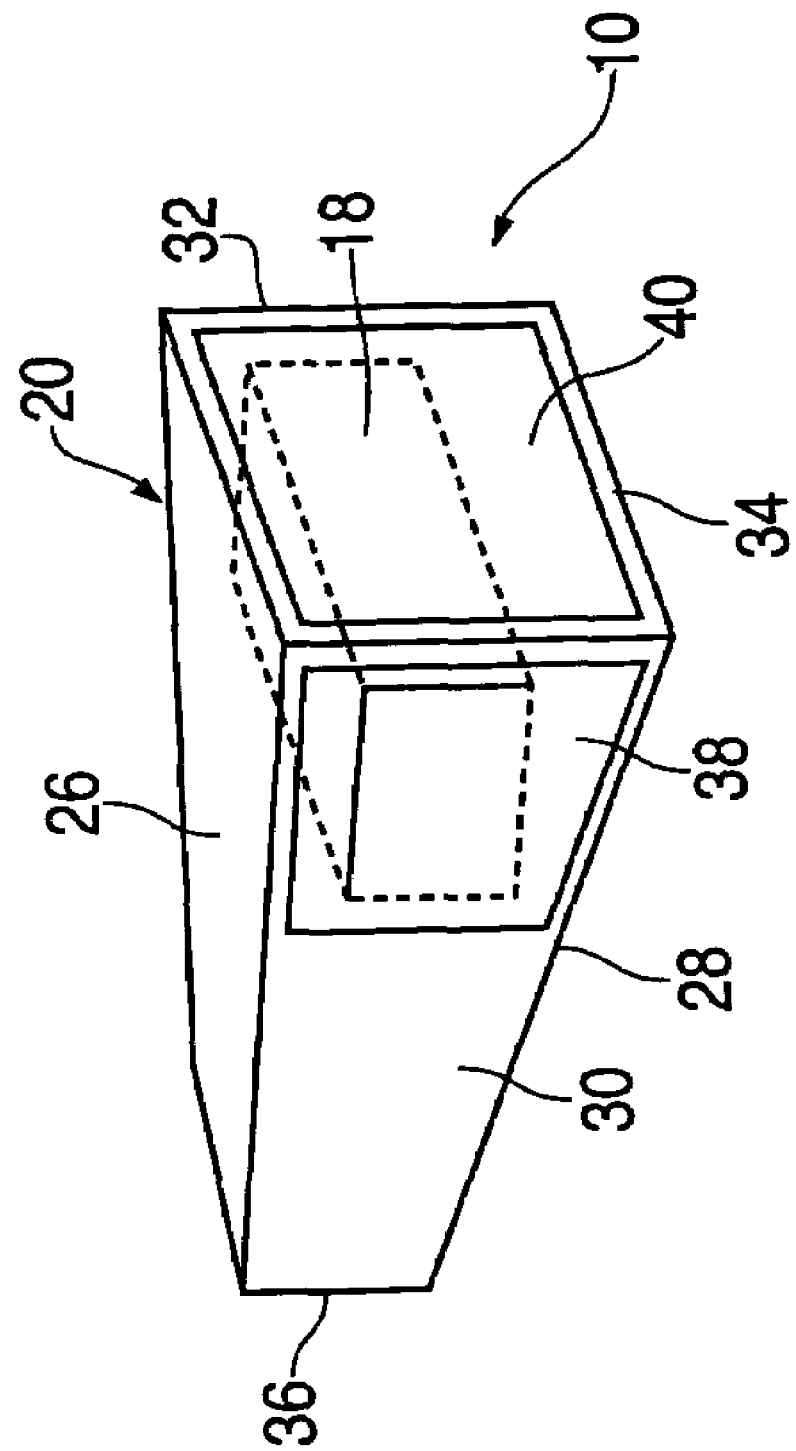
FIG. 2 is a perspective view illustrating an infrared-seeking threat decoy that can be mounted to an aircraft engine structure as shown in FIG. 1.

FIG. 2 illustrates an embodiment of a thermal radiation-generating decoy 10 including an internal heat source 18 inside of an enclosure 20. The enclosure can include, for example, an upper face 26, a lower face 28 (not visible in FIG. 2), a left face 30, a right face 32 (not visible in FIG. 2), an aft face 34 and a forward face 36. The heat source 18 can include any suitable heat generating device, such as a combustion device or an electrical device. In particular, a preferred embodiment of the invention can include a heat source 18 that is a combustion device designed to burn the same type of fuel as an aircraft engine, such as jet fuel or kerosene.

The enclosure faces 26, 28, 30, 32, 34, 36 can be formed from a sheet metal, such as steel, or an alloy of aluminum or titanium. In addition, the enclosure faces 26, 28, 30, 32, 34, 36 can include portions that are substantially transparent to thermal radiation, such as the side pane 38 and the aft pane 40 shown in FIG. 2. The thermal radiation-transparent panes can allow the radiation field created by the heat source 18 to radiate heat of different amounts in selected directions to create a thermal signature of the decoy 10 that is generally based on the inherent thermal signature of the overall aircraft.

For example, the decoy 10 can emit a relatively high amount of infrared energy through an aft pane 40 in order to mimic the thermal signature of the aircraft engine exhaust. Similarly, the decoy 10 can emit a significant infrared energy through a side pane 38 to mimic the side thermal signature of an aircraft, composed of, for example, the engine exhaust heat, the heated surfaces of the fuselage, and lighting system radiation. Thus, all of the enclosure faces 26, 28, 30, 32, 34, 36, including thermal radiation-transparent panes, and the size or energy output and placement of the heat source 18, can be configured to create a thermal signature that generally mimics the aspect proportionality of the overall thermal signature of the aircraft.

The overall thermal radiation emission and directional distribution, or thermal signature, of the decoy 10 can thus be similar to that of the aircraft. The radiation intensity (typically measured in Watts per steradian, W/sr) of a large commercial aircraft can be in the range of several hundred to greater than 1,000 W/sr, and is highly dependent on the directional aspect of view. For example, the thermal signature of a typical aircraft is greatest when observed from directly aft, primarily due to visibility of very hot surfaces in the interior of the engine exhaust nozzle.

Nevertheless, in various embodiments of the present invention, the radiation intensity of the decoy 10 in any direction can be significantly greater or less than that of the aircraft. For example, in an embodiment, the radiant intensity of the decoy 10 in a direction can be approximately twice that of the aircraft. In another embodiment, the radiant intensity of the decoy 10 in a direction can be approximately half that of the aircraft. In a preferred embodiment, the intensity and the directional distribution of the infrared radiation field of the decoy 10 can be generally proportional to the overall aircraft thermal signature. That is, a substantially proportional fraction of the overall thermal energy can be emitted from each of the enclosure faces 26, 28, 30, 32, 34, 36 to create a scaled thermal signature generally corresponding to the characteristics of the aircraft thermal signature.

Thus, the thermal signature of the decoy 10 can be designed to effectively mimic that of the aircraft from all required threat approach angles. For example, the sides or faces of the enclosure can be trapezoidally shaped such that each surface of the enclosure 20 has a unique area, angle and resulting thermal signature. In a preferred embodiment, the top surface 26 and the front surface 36 can be insulated. Similarly, the lower surface 28 can be partially heated and air can be vented out, for example, from the lower surface 28.

The heat source 18 can be heated to a temperature or heat level that optimizes the spectral and spatial infrared signature of the decoy 10 to create a most desirable seek-point for an infrared-seeking threat, in order to control the threat aimpoint during the terminal phase of flight, that is, in order to control the terminal maneuvering of the threat. Thus, the heat source 18 can be turned on during periods or in proximity of potential threats for an indefinite period of time for example, during takeoff and climb or approach and landing, and turned off during periods when the threat probability is low, for example, during the cruise phase of flight. (Typical shoulder-launched IR missiles have a limited altitude capability, for example, between 10,000 and 15,000 feet.)

Figure 3:
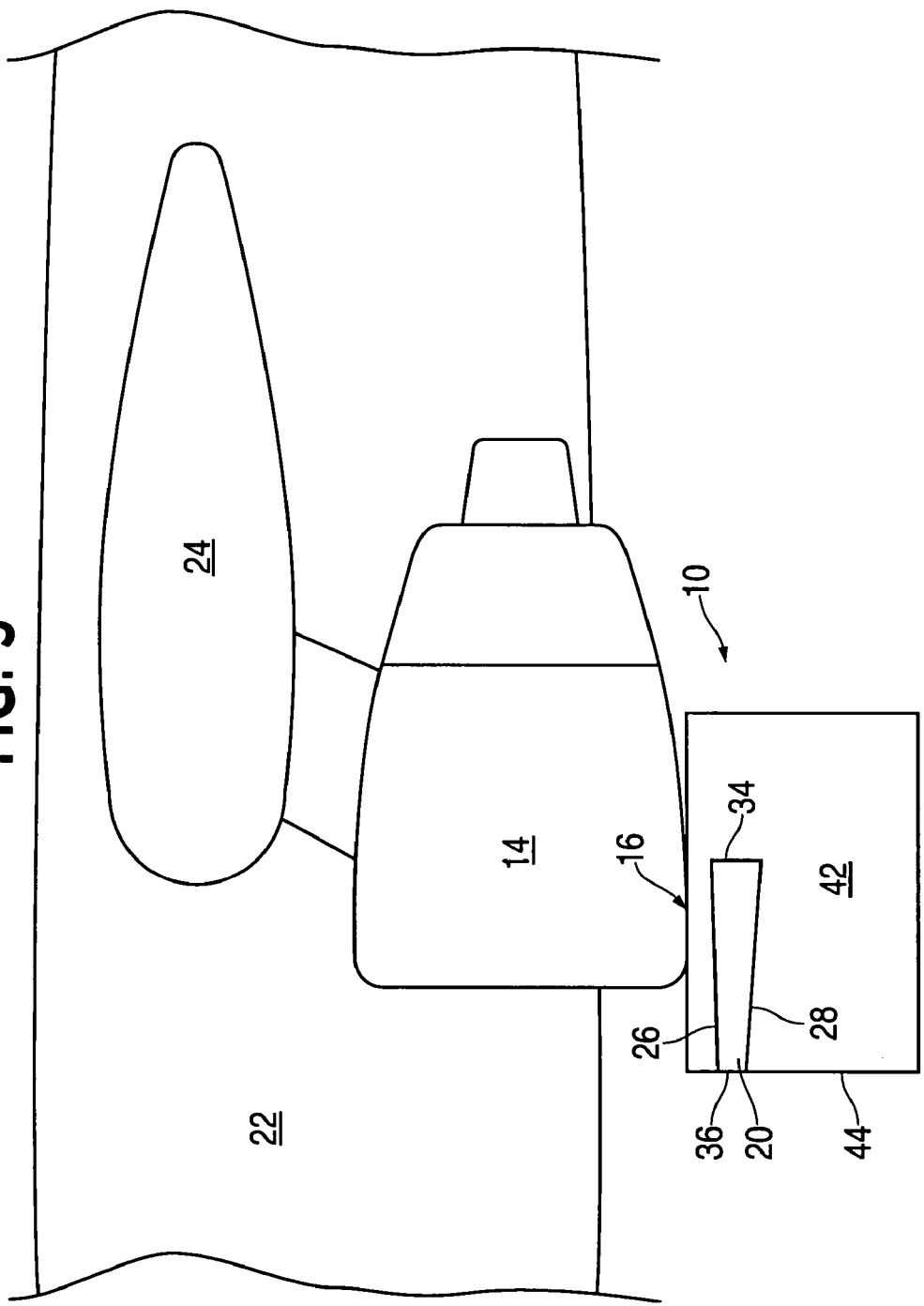
FIG. 3 is a side view of an infrared-seeking threat decoy mounted to a fuse shield that is in turn mounted to an aircraft engine structure.

FIG. 3 shows an alternative embodiment of the thermal radiation-generating decoy 10 that includes a fuse shield 42 adjacent the enclosure 20. The fuse shield 42 can detonate the warhead of a threat that bypasses or misses the enclosure 20 within an aspect of the fuse shield 42, that is, within the effective area of the fuse shield 42 as viewed from the approach trajectory angle of the threat. In a preferred embodiment, the fuse shield 42 can have a relatively large lateral aspect, that is, the surface area of the fuse shield 42 as viewed from the side view of the aircraft, as shown in FIG. 3. Likewise, the fuse shield 42 can have a relatively small frontal area and a relatively small aft area.

Thus, as a threat approaches the aircraft from an angle other than directly from the side, front or aft of the aircraft, the effective area of the fuse shield 42 as viewed from the approach angle of the threat is defined as the aspect of the fuse shield 42. If the approach trajectory of the threat is imprecise and the threat does not impact the enclosure 20, the threat can still be detonated if the flight trajectory of the threat intersects the aspect of the fuse shield 42 as viewed from the approach angle of the threat. Thus, depending upon the threat flight trajectory, there can be a high probability of a miss from directly forward or aft of the aircraft, a high probability of a strike to the fuse shield from the side or outboard direction, or a high probability of a strike to the fan casing or forward portion of the engine nacelle 14 from directly below.

Furthermore, in a preferred embodiment, the fuse shield 42 can be attached to an aircraft structure, for example, an engine nacelle 14 as shown in FIG. 3. Likewise, the enclosure 20 can be attached to the fuse shield 42 as shown in FIG. 3. Thus, the fuse shield 42 can form part of a mounting interface 16 to attach the enclosure 20 to the engine nacelle 14.

In a preferred embodiment, the fuse shield 42 can be designed to have a front edge 44 that is approximately coplanar with the forward face 36 of the enclosure 20. The fuse shield 42 can protrude aft of the aft face 34 of the enclosure 20, as shown in FIG. 3. Furthermore, the fuse shield 42 can fill any space between the upper face 26 of the enclosure 20 and the engine nacelle 14, as well as extend significantly beyond the lower face 28 of the enclosure 20 to present a relatively large lateral aspect, as shown in FIG. 3. Similar to the placement of the enclosure 20, the extension of the fuse shield 42 aft of the enclosure 20 can serve to detonate a threat that is off target to the rear of the enclosure 20, but allow a threat that is off target forward of the enclosure 20 to continue its flight trajectory, since a threat that bypasses the decoy 10 forward of the engine nacelle 14 is not likely to intercept the aircraft fuselage 22.

Figure 4:
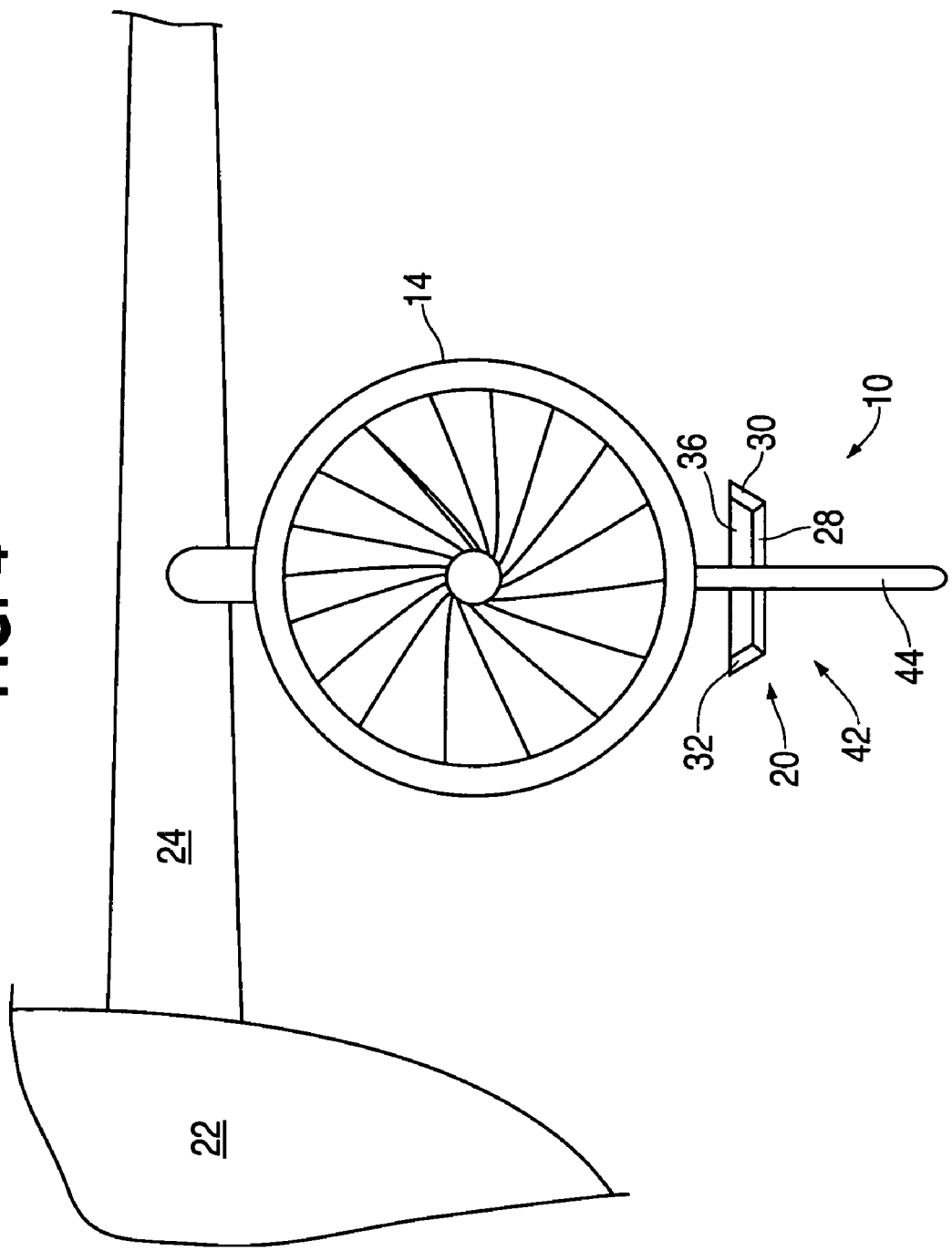
FIG. 4 is a front view of the infrared-seeking threat decoy of FIG. 3.

As shown in FIG. 4, in a preferred embodiment, the fuse shield 42 can have a relatively small frontal area 44 to reduce the amount of drag on the aircraft caused by the fuse shield 42. In addition, the fuse shield 42 can be designed with an aerodynamic shape, such as an airfoil with equal chord lengths on each side. The fuse shield can be optimized for aerodynamic and weight considerations and is not required to be of robust construction, since even a slight impact will cause missile detonation.

Moreover, the fuse shield 42 can be made of a frangible material, that is, a material that breaks up, shatters, or disintegrates into relatively small fragments upon impact with a threat or detonation of a threat warhead to avoid secondary damage to the aircraft by relatively large dislodged pieces of the fuse shield 42. For example, the fuse shield 42 could be made of graphite, or a composite material that has sufficient stiffness and strength to withstand the aerodynamic forces, but is sufficiently brittle to break up into small pieces upon impact with a missile threat or detonation of a threat warhead.

Furthermore, the fuse shield 42 can include portions that are substantially transparent to thermal radiation, such as thermal radiation-transparent panes, cutouts or grid sections adjacent the enclosure 20 to allow infrared visibility of the enclosure 20 from all angles. For example, a thermal radiation-transparent grid suitable for use with an embodiment of the invention could form openings that have a dimension less than the diameter of most MANPADS, for example, a square grid with metal strips spaced approximately two inches apart. Thus, the radiation field emitted by the enclosure 20 can be only minimally blocked by portions of the fuse shield 42 that would otherwise block the view of a portion of the enclosure 20 from certain approach angles.

FIG. 3 and FIG. 4 depict the fuse shield 42 and the enclosure 20 mounted adjacent an engine nacelle 14. However, in alternative embodiments of the invention, the thermal radiation-generating decoy 10, including the fuse shield 42 and the enclosure 20, can be mounted adjacent any aircraft structure. In particular, the fuse shield 42 and the enclosure 20 can be mounted to a relatively less vulnerable aircraft structure, such as a wingtip or tail section, to which the infrared-seeking threat can be drawn in order to increase aircraft survivability.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A decoy mountable adjacent an aircraft engine structure, comprising:
   a heat source;
   an enclosure that at least partially encloses the heat source, wherein the enclosure is mounted below a forward portion of the engine structure to attract an infrared-seeking threat; and
   a fuse shield disposed below the enclosure, the fuse shield comprising a panel that extends downward from the enclosure and along an axis of the engine structure.

2. The decoy of claim 1, wherein the enclosure is mounted approximately on an opposite side of the engine structure from a vulnerable aircraft structure.

3. The decoy of claim 1, wherein the engine structure includes an engine nacelle.

4. The decoy of claim 1, wherein the enclosure is mounted approximately adjacent a lower extreme of an engine nacelle.

5. The decoy of claim 1, wherein the enclosure is mounted directly below a forward portion of an engine nacelle.

6. The decoy of claim 1, wherein the enclosure is mounted to a fan containment portion of an engine nacelle.

7. The decoy of claim 1, wherein the enclosure is mounted such that the enclosure protrudes at least partially forward of an engine nacelle.

8. The decoy of claim 1, wherein the heat source includes a burner that combusts a same type of fuel as an aircraft engine.

9. The decoy of claim 1, wherein the decoy has a thermal signature at least partially based on an aircraft thermal signature.

10. The decoy of claim 9, wherein the enclosure includes a shape configured to create the thermal signature.

11. The decoy of claim 1, wherein the enclosure comprises a substantially thermal radiation-transparent portion.

12. The decoy of claim 1, wherein the decoy is configured to attract a shoulder-fired missile.

13. The decoy of claim 1, further comprising a fuse shield fixedly coupled adjacent the enclosure to detonate the threat in the case that the threat bypasses the enclosure within an aspect of the shield.

14. A decoy comprising:
   a fuse shield mounted to an engine nacelle of an aircraft, the fuse shield including an airfoil panel extending downward from a forward portion of the engine and in line with an axis of the engine nacelle;
   a heat source; and
   an enclosure that at least partially encloses the heat source, wherein the enclosure is mounted to a body portion of the fuse shield, the enclosure being disposed below and forward to the engine and the enclosure extending outward from both sides of the fuse shield to attract an infrared-seeking threat.

15. The decoy of claim 14, wherein the fuse shield has a relatively large lateral aspect and a relatively small frontal aspect.

16. The decoy of claim 14, wherein the fuse shield extends aft but not forward of the enclosure.

17. The decoy of claim 14, wherein the fuse shield includes a frangible material.

18. The decoy of claim 14, wherein the fuse shield includes a substantially thermal radiation-transparent portion such that a radiation field of the decoy remains substantially unblocked by the fuse shield.

19. A decoy comprising:
   means for generating heat;
   means for enclosing the heat-generating means, wherein the means for enclosing is mounted below a forward portion of an engine nacelle of an aircraft to attract an infrared-seeking threat; and
   a fuse shielding means disposed below the enclosure, the fuse shielding means comprising a panel that extends downward from the means for enclosing and along an axis of the engine nacelle.

20. The decoy of claim 19, wherein the means for enclosing is mounted approximately adjacent a lower extreme of a forward portion of the engine nacelle.

21. A decoy comprising:
   a fuse shield means mounted to an engine nacelle of an aircraft, the fuse shield means including an airfoil panel extending downward from a forward portion of the engine nacelle and in line with an axis of the engine nacelle;
   means for generating heat;
   means for enclosing the heat-generating means, wherein the means for enclosing is mounted to a body portion of the fuse shield means, the means for enclosing extending outward from both sides of the fuse shield means to attract an infrared-seeking threat.

22. The decoy of claim 21, wherein the fuse shield means comprises pervious means for permitting a radiation field of the decoy to pass substantially unblocked through at least a portion of the fuse shield means.

* * * * *